March 11, 1930. P. R. STRAUS 1,750,370
CAMERA STRAP FOR MEASURING DISTANCES
Filed June 12, 1928
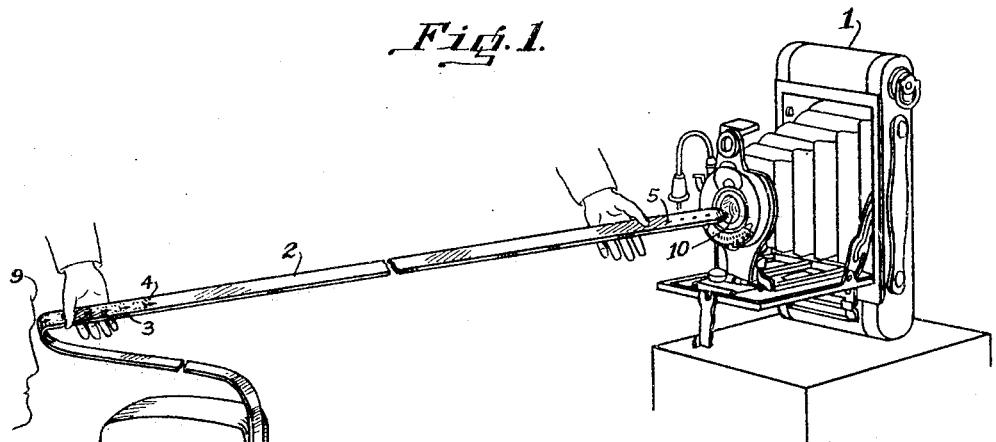
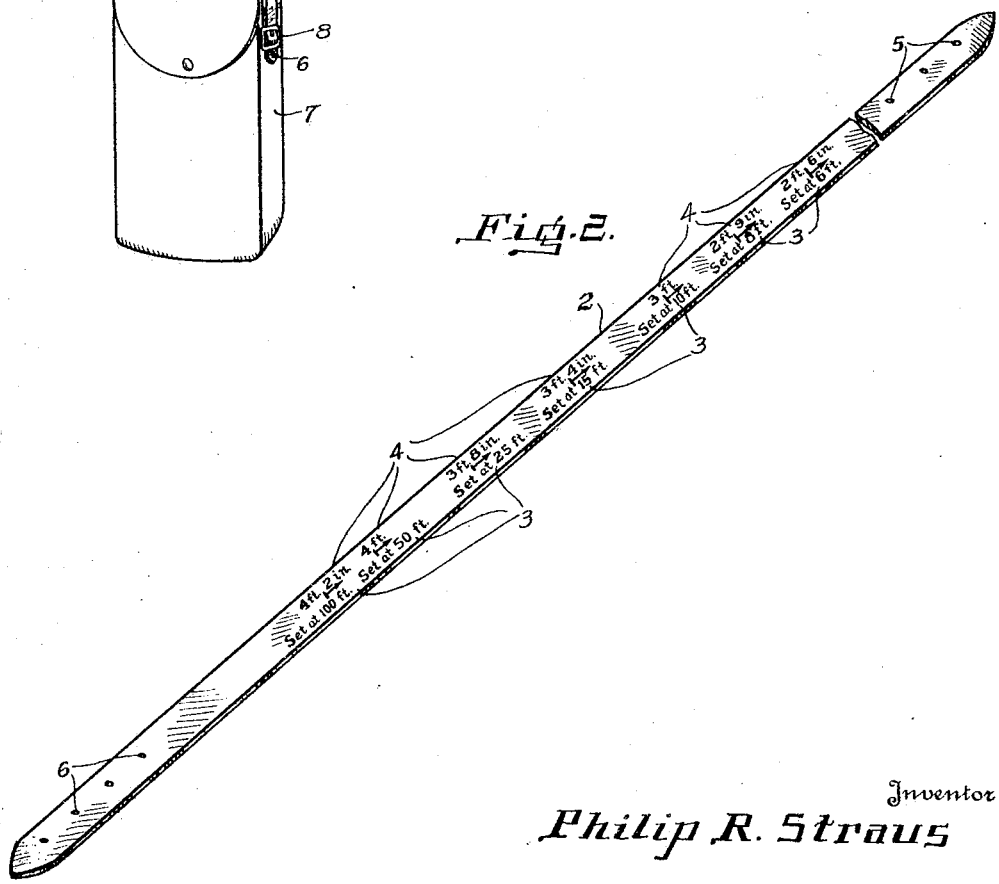
Inventor
Philip R. Straus
By Mason Fenwick&Lawrence
Attorneys Patented Mar. 11, 1930

1,750,370

UNITED STATES PATENT OFFICE

PHILIP RAYNER STRAUS, OF BALTIMORE, MARYLAND

CAMERA STRAP FOR MEASURING DISTANCES

Application filed June 12, 1928. Serial No. 284,804.

This invention relates to improved means for measuring the distance between the subject to be photographed and the lens of the camera.

A prime object of this invention is to arrange the strap of a camera case in the form of a measuring device for distances in such a manner that the designating marks on the strap will not only act as a means for measuring the distance between the subject to be photographed and the camera lens, but will also function as a source of suitable instructions as to the proper focus at which the camera should be set.

Another object of this invention is to mark the strap of an ordinary camera carrying case in such a manner that it may become a measuring device for accurately designating the distance between the subject to be photographed and the lens of the camera for the purpose of correct focusing.

A further object of this invention is to provide a convenient measuring device ordinarily attached to the camera and its carrying case, and which may be readily utilized with the camera in cases where portrait or short distance attachment lens are employed, and where for set focus of the camera, the distance from the subject is comparatively short and must be accurately gauged or measured.

Objects of this invention will appear from the following detailed description of the device, as disclosed in the single sheet of drawing which is herewith made a part of this application.

In the drawings—

Figure 1 illustrates a perspective view of the camera measuring device disclosing the means for determining the distance between the subject to be photographed and the lens of the camera.

Figure 2 designates a perspective view of a camera strap disclosing thereon the markings required to properly determine the distance from the subject to be photographed and the lens of the camera in relationship to the focus thereof, and instructions for properly setting the focus for various distances of subject from camera, or obtaining proper distances from lens to subject for various focal settings of the camera.

Numeral 1 designates a camera of the ordinary type, such as an autographic kodak, and provided with a portrait attachment, diffusion or otherwise, as may be desired.

In practice it has been found that some subjects may be photographed readily when holding the camera in the hand, but under certain conditions it is highly advisable to use a tripod or some suitable support on which the camera may rest in a fixed position, owing to the fact that the subject must be placed at a certain distance from the lens in order to obtain the most satisfactory results, and this invention provides a measuring device consisting of the camera strap 2, made of any suitable material such as leather, and adapted to have suitably positioned thereon the focus instructions 3, for the corresponding distances 4. The markings may be embodied upon the strap preferably on the inner face thereof in any suitable manner, such as stamping on the leather itself, the use of clips, printing on the lining of the strap, or printed labels pasted thereon.

The camera strap utilized in this invention may be of a general type commonly detachably fastened at the two ends 5 and 6, to a camera case 7, which may also be made of leather or other desirable material, the strap 2 being detachably fastened to the case 7, as clearly disclosed at 8.

In operation, this invention provides a measuring strap easily available at all times and having the plural utility of a shoulder support or carrying strap for a camera case and a measuring device for accurately gauging the distance from the subject 9 to be photographed and the lens 10 of the camera 1, thereby providing a means for accurately focusing the camera.

Furthermore, the strap, according to this invention, includes proper instructions as to the focus at which the camera should be set. The device applies especially to the use in ordinary practice in connection with portrait or short distance attachment lenses where, for a definite focus of the camera, the distance from the subject is comparatively short, ranging anywhere from two feet to four feet, and owing to the nature of the operation must be very accurately gauged or measured.

A camera strap arranged in this manner provides a simple and convenient measuring device by merely detaching one end from the camera case, as clearly disclosed in Figure 1, and then measuring the distance between the subject and the lens of the camera, at the same time noting the proper instructions for the focal length at which the lens must set, all of which information is clearly noted upon the measuring strap, and is a great improvement over the common practice of reading the instructions on a loose slip usually received on the purchase of a camera. This slip is many times unavailable when needed and is easily lost or misplaced. Furthermore, after reading the instructions upon the slip, it is ordinarily necessary to obtain a yard stick or other measuring device for the purpose of determining the distance from the camera lens to the subject.

Obviously, this invention provides a device which will not only measure the distance, but will also furnish the focus instructions now found upon the camera slips.

It will be understood that many changes and modifications may be made in the form or embodiment of the invention within the scope of the following claim without departing from the spirit of the invention.

The measuring tape shown in this application is intended for use only where short distance or portrait attachment lenses are substituted for the original lenses. With such substituted lenses the ordinary distance scale of the camera is useless, and it is necessary to find some means for translating the scale graduations into terms suitable for use when the distances are very short; accordingly, tape 2 is provided with graduations 4 which indicate actual distances between the camera and the subject being photographed.

Adjacent each of the distance graduations 4 is a camera focusing legend 3 which indicates the distance at which the lens of the camera must be set on the usual camera focusing scale to correspond to the distance between the camera and the subject as indicated by the graduations 4; for example, if the distance between the camera provided with the short distance attachment lens is 4' 2" as measured by the tape 2, the distance at which the lens carrier of the camera must be set on the usual lens focusing scale is that corresponding to a distance of a hundred feet. Similarly, if the distance is three feet, the lens carrier of the camera must be set with its indicator at the graduation corresponding on the focusing scale to a distance of ten feet when the camera is used without the lens attachment.

The scale 3 does not, therefore, indicate the actual distance between the camera provided with the short distance attachment and the subject being photographed. The graduations thereof do correspond to the setting required for the various distances indicated by the scale 4 when a short distance attachment lens is being used.

What I claim is:

A tape for use with cameras having a short distance or portrait lens substituted for the usual lens; said tape having graduations thereon to indicate distances of a subject from a camera and having legends at each graduation to indicate the scale setting of the lens relative to the usual camera focusing scale to correspond to the said graduation.

PHILIP RAYNER STRAUS.